(12) United States Patent
Ritter et al.

(10) Patent No.: US 8,008,220 B2
(45) Date of Patent: Aug. 30, 2011

(54) USE OF LEAD-FREE AND PHOSPHATE-CONTAINING GLASSES IN A PRECISION MOULDING PROCESS

(75) Inventors: Simone Monika Ritter, Mainz (DE); Christopher Klein, Clarks Summit, PA (US); Christian Schenk, Ingelheim (DE); Frank-Thomas Lentes, Bingen (DE); Petra Auchter-Krummel, Vendersheim (DE); Rainer Jaschek, Ingelheim (DE); Steffen Reichel, Mehlingen (DE); Michael Waschulewski, Dietzenbach (DE); Stephan Kuepper-Brennberger, Wiesbaden (DE)

(73) Assignee: Schott AG, Mainz (DE)

( * ) Notice: Subject to any disclaimer, the term of this patent is extended or adjusted under 35 U.S.C. 154(b) by 915 days.

(21) Appl. No.: 11/223,133

(22) Filed: Sep. 12, 2005

(65) Prior Publication Data

US 2006/0111231 A1    May 25, 2006

(30) Foreign Application Priority Data

Sep. 10, 2004  (DE) .......................... 10 2004 044 282

(51) Int. Cl.
*C03C 3/17* (2006.01)
*C03B 11/00* (2006.01)

(52) U.S. Cl. ................. 501/48; 501/44; 501/45; 501/46; 501/47; 65/63

(58) Field of Classification Search ................. 501/44, 501/45, 46, 47, 48; 65/63
See application file for complete search history.

(56) References Cited

U.S. PATENT DOCUMENTS

| | | | |
|---|---|---|---|
| 4,391,915 A | 7/1983 | Meden-Pisslinger et al. | |
| 4,615,989 A * | 10/1986 | Ritze ............................. | 501/44 |
| 5,173,212 A | 12/1992 | Speit et al. | |
| 5,607,886 A | 3/1997 | Onozawa | |
| 5,750,448 A * | 5/1998 | Grabowski et al. ............. | 501/47 |
| 5,824,615 A | 10/1998 | Chang | |
| 7,140,205 B2 * | 11/2006 | Fujiwara et al. .................. | 65/64 |
| 7,157,391 B2 * | 1/2007 | Kasuga et al. .................. | 501/45 |
| 7,396,787 B2 * | 7/2008 | Ritter et al. ...................... | 501/48 |
| 7,538,051 B2 | 5/2009 | Fujiwara | |
| 2004/0138043 A1 * | 7/2004 | Kasuga et al. .................. | 501/45 |
| 2004/0212060 A1 | 10/2004 | Hachitani | |
| 2005/0054511 A1 | 3/2005 | Fujiwara et al. | |
| 2006/0150682 A1 * | 7/2006 | Fujiwara et al. ................. | 65/102 |
| 2007/0099787 A1 * | 5/2007 | Hayden et al. .................. | 501/48 |

FOREIGN PATENT DOCUMENTS

| | | |
|---|---|---|
| JP | 03008741 | 1/1991 |
| JP | 05078148 | 3/1993 |
| JP | 1-126-8927 | 5/1999 |
| WO | WO 2004041741 | 5/2004 |

OTHER PUBLICATIONS

Machine English Translation JP 2002-211951, Jul. 31, 2002.*
International Search Report for French Application No. 0509258.
Sakamoto Osamu, "Near infrared light cutting filter glass", Patent Abstracts of Japan, Publication No. 05078148, Publication Date: Mar. 30, 1993, Application Date: Feb. 2, 1992, Application No. 04069538.
Yogo Masao, "Phosphate Glass and Preparation Thereof", Patent Abstracts of Japan, Publication No. 03008741, Publication Date: Jan. 16, 1991, Application Date: Jun. 6, 1989, Application No. 01143660.
Masao, Yogo; "Near-Infrared Cut-Off Filter Glass" Patent Abstracts of Japan; Publication No. 03-137037; Publication Date: Jun. 11, 1991; JP Application No. 01-272245; Filing Date: Oct. 18, 1989.
Kaoru, Yokota, et al.; "Infrared Ray-Shielding Green Glass" Patent Abstracts of Japan; Publication No. 2002-211951; Publication Date: Jul. 31, 2002; JP Application No. 2001-003291; Filing Date: Jan. 11, 2001.
Kaoru, Yokota, et al.; "Blue-Colored Glass" Patent Abstracts of Japan; Publication No. 2002-316834; Publication No. 2002-316834; Publication Date: Oct. 31, 2002; JP Application No. 2001-122841; Filing Date: Apr. 20, 2001.

* cited by examiner

*Primary Examiner* — Karl E Group
*Assistant Examiner* — Elizabeth A Bolden
(74) *Attorney, Agent, or Firm* — Millen, White, Zelano & Branigan, P.C.

(57) ABSTRACT

The present invention relates to the use of lead-free and phosphate-containing glasses, preferably colored and filter glasses which absorb light in the infrared region (IR-region), in a precision molding process. Preferably, the content of fluorine in the glass is low.
Advantageously, so optical constituents can be produced without finishing, such as for example lenses for digital cameras. By the use according to the present invention, also other optical constituents can be produced which can be directly used for a corresponding technical purpose. For an advantageous use, the optical constituents produced by precision molding can be used in the fields imaging, projection, telecommunications, optical communications engineering and laser technology.

7 Claims, 3 Drawing Sheets

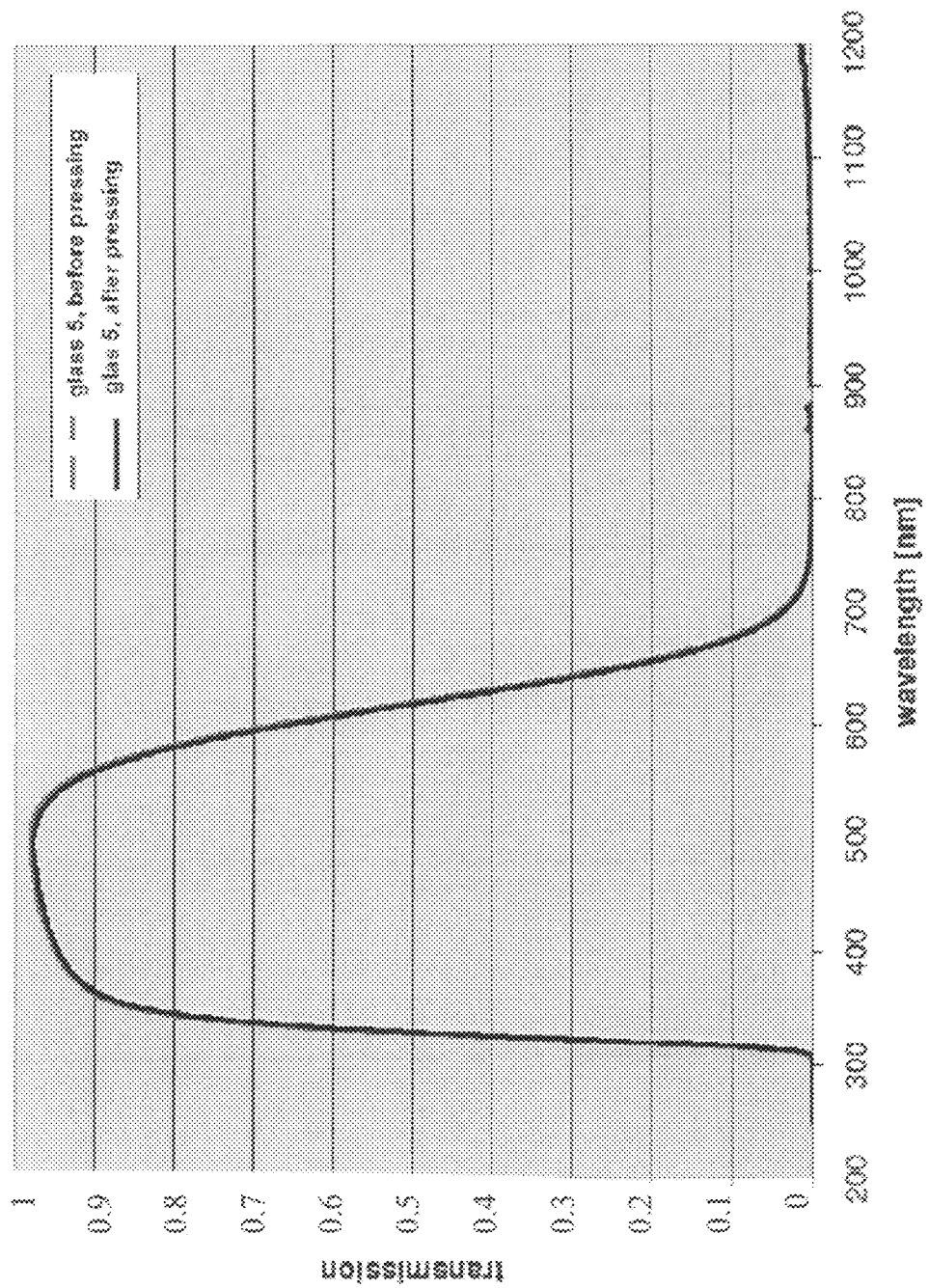

Fig. 3

| glass No. | glass 1 wt% | glass 2 wt% | glass 3 wt% | glass 4 wt% | glass 5 wt% | glass 6 wt% | glass 7 wt% |
|---|---|---|---|---|---|---|---|
| $P_2O_5$ | 72,39 | 71,59 | 74,89 | 67,97 | 69,99 | 72,22 | 75,06 |
| $SiO_2$ | 0,48 | 1,28 | 0,5 | | | 0,48 | |
| $Al_2O_3$ | 8,5 | 3,87 | 8,79 | 4,74 | 4,88 | 8,47 | 5,46 |
| $B_2O_3$ | 2,35 | 1,29 | 2,43 | 1,45 | 1,49 | 2,35 | 4 |
| ZnO | 0,58 | 4,51 | 0,6 | 0,46 | 0,47 | 0,58 | 5,61 |
| $Li_2O$ | 0,55 | | 0,57 | 4,61 | 4,75 | 0,55 | 3,77 |
| $Na_2O$ | 1,77 | 0,55 | 1,83 | 4,61 | 4,75 | 1,77 | 0,37 |
| $K_2O$ | 3,24 | 3,34 | 3,35 | 3,4 | 3,5 | 3,24 | |
| CaO | 0,36 | 2,86 | 0,37 | 0,69 | 0,71 | 0,36 | |
| BaO | 0,61 | 8,02 | 0,63 | 5,65 | 5,82 | 0,61 | |
| MgO | 3,5 | 1,43 | 3,62 | | | 3,49 | |
| $SnO_2$ | | | | | 0,36 | | |
| $CeO_2$ | 0,29 | | 0,3 | 0,35 | | 0,29 | |
| $As_2O_3$ | 0,24 | | 0,25 | 0,22 | 0,22 | 0,24 | 0,09 |
| CuO | 5,13 | | 1,85 | 5,86 | 3,06 | 5,36 | 5,65 |
| CoO | | 0,79 | | | | | |
| Σ | 100 | 99 | 100 | 100 | 100 | 100 | 100 |
| $P_2O_5+Al_2O_3$ | 81 | 75 | 84 | 73 | 75 | 81 | 81 |
| Σ $M_2O$ | 6 | 4 | 6 | 13 | 13 | 6 | 4 |
| Σ MO | 5 | 17 | 5 | 7 | 7 | 5 | 6 |
| properties | | | | | | | |
| Tg [°C] | 459 | 460 | 466 | 321 | 305 | 477 | 392 |
| EW [°C] | | | | | | | 525 |
| $\alpha_{(20-300°C)}$ [$10^{-6}$/K] | | | | | | | 10 |
| ρ [g/cm³] | 2,68 | 2,76 | 2,62 | 2,73 | 2,67 | 2,69 | 2,69 |
| $n_d$-catalogue | 1,54 | 1,53 | 1,53 | 1,54 | 1,53 | 1,54 | 1,542 |
| $n_d$ determined | | | | 1,53534 | 1,53078 | | |
| $n_e$ determined | | | | 1,53743 | | | |
| $n_d$ determinde after pressing | | | | | 1,53001 | | |
| $n_e$ determined after pressing | | | | 1,53444 | | | |
| Δ $n_d$ or $n_e$ (before and after pressing) | | | | 0,003 | 0,0008 | | |

USE OF LEAD-FREE AND PHOSPHATE-CONTAINING GLASSES IN A PRECISION MOULDING PROCESS

The present invention relates to the use of lead-free and phosphate-containing glasses, preferably coloured and filter glasses which absorb light in the infrared region (IR-region), in a precision moulding process.

Advantageously, so optical constituents can be produced without finishing, such as for example lenses for digital cameras. By the use according to the present invention, also other optical constituents may be produced which can be directly used for a corresponding technical purpose. For an advantageous use, the optical constituents produced by precision moulding can be used in the fields imaging, projection, telecommunications, optical communications engineering and laser technology.

In recent years, the trend on the market in both optical and also optoelectronic technologies (fields of application imaging, projection, telecommunications, optical communications engineering and laser technology) increasingly tends to miniaturization. Indications for this are the final products which become smaller and smaller, and this naturally requires an increasing miniaturization of the single constituents and components of such final products. For the manufacturer of optical glasses, this development is connected with a distinct decrease of the volumes of raw glass demanded, despite increasing batches of final products. At the same time, there is an increasing pricing pressure for the manufacturer of glasses from the finishing companies, since during the production of such smaller components from block and/or ingot glass the percentage of waste based on the product which is produced is much higher und the processing of such extremely small parts requires a higher effort than for greater constituents.

Instead of removing glass portions from block or ingot glass for optical components which has been customary till today, therefore recently manufacturing methods become more important in which directly after the glass melt "preforms" respectively pills such as e.g. gobs or spheres which nearly have the final shape respectively geometry can be obtained. For example, there is an increasing demand of the finishing companies for pills nearly having the final geometry for remoulding, so-called "precision gobs". Normally, "precision gobs" are preferably completely fire-polished glass portions having been shaped semi-free or free which are already portioned and have a geometry that is near the final shape of the optical component.

Advantageously, such precision gobs may be converted to optical elements such as lenses, aspheres etc. by the so-called precision moulding (also: "precision pressing"). Then, no longer a further processing of the geometric form or the surface by e.g. a surface polish is required. Through this method a flexible way was found to deal with small glass melt volumes (distributed to a large batch of small pieces of material) by short set-up times. Due to the relatively small number of cycles respectively batch and the normally small geometries, the value added of the method however cannot be originated by the value of the material itself. Thus the products have to leave the press in a state which is "ready for use in the system", i.e. a costly finishing, cooling and/or cold processing can be omitted.

For such a pressing method there has to be used precision facilities with high-grade and thus expensive mould materials, due to the required high geometry accuracies. With this, the profitability of the products and/or materials produced is strongly influenced by the useful working life of such moulds. A very important factor for a long useful working life of the moulds is an operation temperature which is as low as possible, which however can only be lowered to a value such that the viscosity of the materials to be pressed is yet sufficient for the pressing process. So there is a direct causal connection between the processing temperature and with it the transition temperature Tg of a glass to be processed and the profitability of such a pressing process:

The lower the transition temperature of the glass, the higher the useful working lives of the moulds and with it the profitability of the method.

This connection results in the requirement of so-called "low Tg-glasses", glasses having low melt and transition points, i.e. glasses having a viscosity which is sufficient for processing at temperatures which are as low as possible.

Further it is desired to use glasses for precision moulding which have the property to absorb light in the IR-region and which further do not contain lead.

As a further desire, from the view of process engineering of the melt, recently an increasing need for "short" glasses has been reported, which glasses have a viscosity which with a relatively small variation in temperature varies in a specific viscosity range. In the melt process this behaviour has the advantage that the hot moulding times, i.e. the mould-closing times, can be reduced. With this on the one hand, the throughput is increased, i.e. the cycle time is reduced. With this on the other hand, also care is taking of the mould material which has a positive effect on the total production costs, as described above. Such "short" glasses have the additional advantage that through the faster cooling compared to respective longer glasses also glasses having a higher tendency to crystallisation may be processed. A prior formation of nuclei which could be problematic in subsequent secondary hot moulding steps should be avoided.

Further it is also desired that besides having the mentioned and the required optical properties the glasses can be prepared from components which are as cheap as possible and that they are chemically resistant.

It's true that in prior art also glasses with similar optical state are processed by pressing methods, however these glasses have a content of phosphate of lower than 50% by weight (see JP-1-126-8927-A). The same applies to US 20050054511, which patent application has only been published after the priority date of the present application. Lower phosphate contents result in the requirement of the addition of other optionally more expensive and optionally not desired components to allow the use of the glass in a precision moulding process.

US 2004/0212060 also talks about precision moulding processes, however, the glasses referred to in this application (which also has only been published after the priority date of the present application) are fluoro-phosphate glasses with extremely high contents of fluorine (high amounts as from 25-48% of fluorine).

It is the object of the present invention to provide glasses, in particular coloured glasses and filter glasses, with high proportions of phosphate, but which at the same time do not contain lead and are suitable for precision moulding. It should be possible to melt and process the glasses in an easy way and they should have sufficient crystallisation stability. It should be possible to obtain optical constituents by said precision moulding which fulfil the demands on precision etc. which components may be used directly for the desired technical use without further finishing. So for example it is desired to prepare a lens of optical coloured and filter glass through a simple and inexpensive precision moulding process which can be used directly as a lens, for example in a digital camera.

Surprisingly it was found that optical coloured and filter glasses having a high proportion of phosphate which at the same time do not contain lead and which further absorb light in the infrared region are suitable for precision moulding. The proportion of phosphate of the glasses which are used according to the present invention is at least 50% by weight, preferably higher than 55% by weight, further preferably higher than 60% by weight and may be up to 65-70, 75 or 77% by weight.

The glasses for said use according to the present invention are featured through a good meltability and processability, low production costs due to reduced costs for processing and raw materials as well as through a good environmental compatibility.

As already described above, the use of these glasses in a precision moulding process for obtaining optical constituents and elements, such as lenses, aspheres, structured optical elements, etc. leads to excellent results. The products leave the press in a state which is "ready for use in the system", i.e. a costly finishing, cooling and/or cold processing can be omitted.

The use of said glasses according to the present invention in such pressing methods advantageously allows low operation temperatures. Regarding the production costs of the optical elements, this is an essential factor, because due to the required high geometry accuracies precision facilities with high-grade and thus expensive mould materials have to be used for the methods. Thus, the profitability of the products and/or materials prepared is strongly influenced by the useful working life of such moulds. However a very important factor for a long useful working life of the moulds is, as already mentioned above, an operation temperature which is as low as possible which can be kept low in particular in the use of the respective coloured and filter glasses according to the present invention.

Here it is interesting that the temperature during the pressing method can be decreased only to such a temperature that the viscosity of the materials to be pressed is yet sufficient for the pressing method. In using the glasses, due to the low transition temperatures of the glasses (see FIG. 3) the useful working lives of the moulds may be prolonged. Thus, the use according to the present invention results in an economic method. Advantageously, the use of the respective glasses according to the present invention allows that prior and after the pressing the transmittance of these coloured and filter glasses is the same which can also be seen from FIG. 2.

The basic glass system of the glasses which can be used according to the present invention is the alkali phosphate system which intrinsically has a good basis for the intended properties.

The glass has a proportion of $P_2O_5$ respectively phosphate of at least 50% by weight, preferably at least 55% by weight, more preferably at least 60% by weight, even more preferably at least 65% by weight, particularly preferably at least 70% by weight and in particular preferably at least 75% by weight, and because of that it is a good-melting low Tg-glass. The proportion of phosphate is at most 77% by weight.

The glass has a proportion of $Al_2O_3$ of at least 1% by weight, preferably at least 2% by weight, particularly preferably at least 3% by weight. The proportion of $Al_2O_3$ is limited to at most 15% by weight, preferably at most 13% by weight, particularly preferably at most 10% by weight. The given upper limit of 15% by weight should not be exceeded because otherwise the "shortness" of the glass in the viscosity range of $10^{7.6}$ to $10^{13}$ dPas will be lost due to the network-forming properties of $Al_2O_3$. But on the other hand a lowest proportion of 1% by weight of $Al_2O_3$ should be the lower limit, since otherwise the chemical resistance (acid resistance) of the glass could strongly deteriorate.

Preferably the sum $\Sigma P_2O_5+Al_2O_3$ is at least 65% by weight, preferably at least 70% by weight and particularly preferably 72% by weight. At a lower proportion the glass may tend to crystallisation.

The sum of alkali metal oxides $M_2O$ in the glass is 2 to 20% by weight. The glass has a proportion of $M_2O$ of at least 2% by weight, preferably at least 3% by weight and particularly preferably at least 3.5% by weight. Preferably there are contained at most 16% by weight, particularly preferably at most 15% by weight, most preferably at most 14% by weight of alkali metal oxides $M_2O$. The sum of $M_2O$ should not exceed 16% by weight, since otherwise the chemical resistance of the glass may deteriorate and the expansion coefficient may increase very strongly which is a disadvantage for a processing of the glass in a pressing method. The addition of alkali metal oxides helps to optimize the burn on-behaviour, i.e. they act as fluxing agents. Furthermore they make a contribution to the lowering of the Tg and an addition of in particular $Na_2O$ is preferred according to the present invention.

The glass contains a proportion of $Na_2O$ of preferably at least 0.3% by weight, more preferably at least 0.4% by weight, most preferably at least 0.5% by weight. In the glass $Na_2O$ is contained in a proportion of at most 9% by weight, preferably at most 7% by weight, more preferably at most 6% by weight and particularly preferably at most 5% by weight.

If necessary, $K_2O$ may be contained in the glass in a proportion of preferably at least 1% by weight, more preferably at least 2.5% by weight and most preferably at least 3% by weight. The proportion of $K_2O$ is at most 8% by weight and preferably should not exceed 6% by weight, most preferably 4.5% by weight.

If necessary, $Li_2O$ may be contained in the glass in a proportion of preferably at least 0.3% by weight, more preferably at least 0.4% by weight and most preferably at least 0.5% by weight. The proportion of $Li_2O$ is at most 9% by weight and preferably should not exceed 7% by weight, more preferably 6% by weight and most preferably 5% by weight.

In addition, the glass contains one or more components MO which are selected from the group consisting of BaO, CaO, MgO and ZnO and optionally also alkaline-earth metal oxides.

The sum of MO is at most 20% by weight, preferably at most 19% by weight and most preferably at most 18% by weight. The sum of MO is at least 3% by weight, preferably at least 4% by weight and most preferably at least 4.5% by weight.

The glass contains at least 0.2% by weight, preferably at most 7% by weight, particularly preferably at least 0.3% by weight, most preferably at least 0.4% by weight of zinc oxide. The glass contains at most 7% by weight, preferably at most 6% by weight, particularly preferably at most 5% by weight of zinc oxide. ZnO makes a contribution to the desired viscosity temperature behaviour ("short" glass) in the viscosity range of $10^{7.6}$ to $10^{13}$ dPas.

Optionally the glass may contain the alkaline-earth oxides BaO, SrO, MgO and/or CaO, wherein independently from each other each single component is contained in a proportion of at most 10% by weight, preferably at most 9% by weight, most preferably at most 8.5% by weight. If necessary, the alkaline-earth oxides may be contained in the glass in a proportion of preferably at least 3% by weight, more preferably at least 4% by weight and most preferably at least 4.5% by weight.

The alkaline-earth metal oxides MO can be used for the binding of phosphate equivalents. The glass may further contain additional components, such as $TiO_2$ and/or $ZrO_2$, in a proportion which is preferably lower than 2% by weight. Both components may help to adjust the refraction index.

The glasses contain $B_2O_3$ in a proportion of lower than 6% by weight, preferably at most 5% by weight. The strongly network-forming properties of $B_2O_3$ increase the stability of the glasses against crystallisation and the chemical resistance. However, the proportion should not be 6% by weight or higher, since otherwise the network of the glass will be excessively solidified and the Tg and the melt temperature of the glass are undesirably increased. Then the glasses also will become "longer" which is also not preferred according to the present invention.

The glass may contain conventional refining agents in low amounts. Preferably, the sum of the refining agents added is at most 2.0% by weight, more preferably at most 1.0% by weight. As a refining agent at least one of the following components may be contained in the glass (based on % by weight):

| | |
|---|---|
| $Sb_2O_3$ | 0-2 and/or |
| $As_2O_3$ | 0-2 and/or |
| SnO | 0-2 and/or |
| $SO_4^{2-}$ | 0-2 and/or |
| $F^-$ | 0-2 |

During the melt and burn on-process also fluorine and fluorine-containing compounds tend to evaporation and therefore they complicate an exact adjustment of the glass composition. Therefore preferably the glass does comprise fluorine only between 0 and 2% by weight, preferably between 0 and 1% by weight and most preferred the glasses do not contain fluorine at all.

According to the present invention, preferably the phosphate is added to the mixture as a complex phosphate. Also because of this reason, a content of at most 77% by weight of phosphate is preferable, since with a higher content the proportion of "complex phosphates" decreases in favour of "free" $P_2O_5$ which may result in a loss of control of the melt behaviour and noticeably increased evaporation and dust effects, going hand in hand with a deteriorated inner quality. In addition, an increased proportion of free phosphate, i.e. phosphate which is not a complex one, makes higher demands on the safety technique of the production process by which the production costs are increased.

As can be seen from the following example which should help to describe the use according to the present invention, however without limiting the scope of the present invention, with the use according to the present invention the glasses fulfil all needs:

EXAMPLE

The example glasses 4 and 5 were used for the pressing process which is described below:

The preform is inserted into the mould and the complete mould (bottom part of the mould, upper part of the mould, mould ring) is isothermally heated to a viscosity of higher than the dilatometric softening point (approximately $10^{7.6}$ dPas). At this time there is a distance of about 1 mm between the bottom part of the mould respectively the upper part of the mould. To ensure a steady heating of the moulds and preform, the heating time is about 5 min at a temperature which corresponds to a viscosity of about $10^8$ dPas. Subsequently the pressing process starts by applying a force of about 3 kN to the bottom part of the mould, until the transformation of the preform into the optical constituent is complete. When the transformation is finished and the optical constituent has reached its final shape, the cooling process will be started.

For the compensation of the shrinkage of the volume here the optical constituent is pressed with reduced force to a temperature which is below a value that corresponds to Tg (approximately $10^{13.3}$ dPas). After Tg is obtained, the mould is quickly cooled, until the optical constituent can be removed.

FIG. 2 shows the curve of the pure transmittance prior and after the pressing. From FIG. 2 can be seen that the precision moulding has not influenced the transmittance behaviour of the glasses.

FIG. 3 shows examples of glasses and their properties which may preferably be used according to the present invention.

Figure 1:
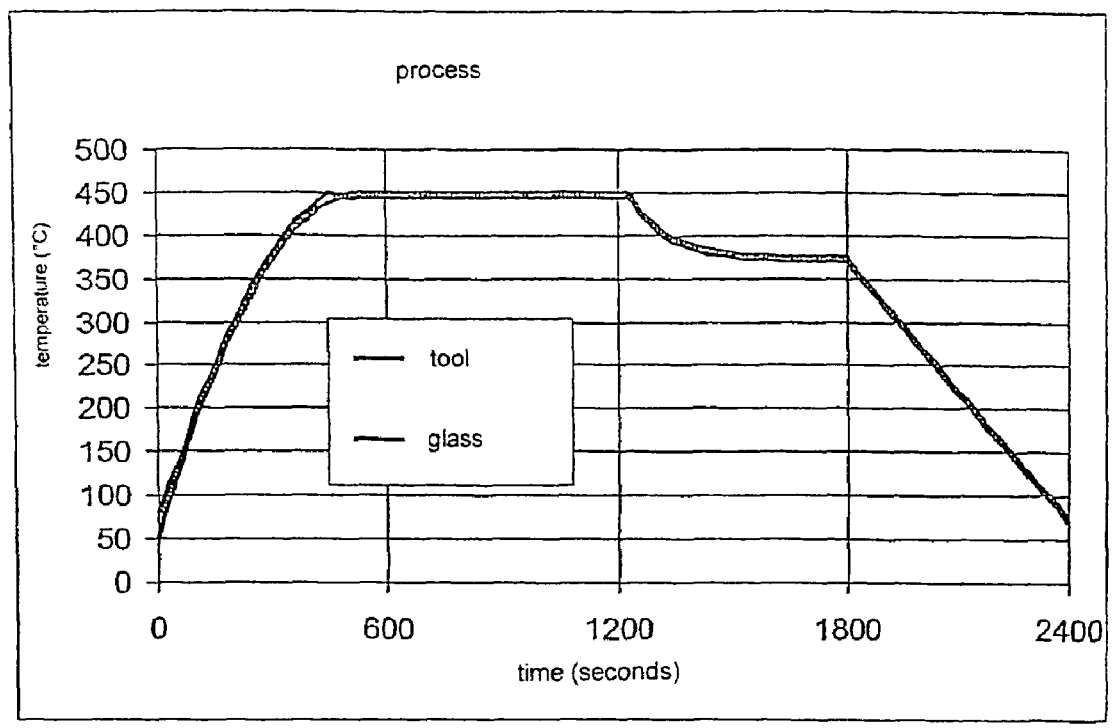
FIG. 1 shows the diagram of the process.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 10 2004 044 282.7-45, filed Sep. 10, 2004 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the production of optical components, comprising precision molding a lead-free colored or filter glass, wherein the glass comprises at least 65% by weight of phosphate ($P_2O_5$), at least 3% by weight of $Al_2O_3$, at least 1.85% by weight of CuO and 0.35% by weight or less of $CeO_2$, and absorbs light in the infrared region, and wherein the glass is free of fluorine.

2. The process according to claim 1, wherein the glass is a colored glass.

3. The process according to claim 1, wherein the optical component is a lens.

4. The process according to claim 3, wherein the lens is aspherical.

5. The process according to claim 3, wherein the lens can be directly used in a digital camera.

6. The process according to claim 1, wherein the proportion of phosphate in the glass is at least 67% by weight.

7. The process according to claim 1, wherein the glass is a filter glass.

* * * * *